United States Patent
Kamp et al.

(10) Patent No.: US 12,432,835 B2
(45) Date of Patent: Sep. 30, 2025

(54) SELECTING ONE OR MORE LIGHT EFFECTS IN DEPENDENCE ON A VARIATION IN DELAY

(71) Applicant: SIGNIFY HOLDING B.V., Eindhoven (NL)

(72) Inventors: Antonie Leonardus Johannes Kamp, San Francisco, CA (US); Aloys Hubbers, Eindhoven (NL); Dzmitry Viktorovich Aliakseyeu, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 754 days.

(21) Appl. No.: 16/972,716

(22) PCT Filed: Jun. 4, 2019

(86) PCT No.: PCT/EP2019/064501
§ 371 (c)(1),
(2) Date: Dec. 7, 2020

(87) PCT Pub. No.: WO2019/234028
PCT Pub. Date: Dec. 12, 2019

(65) Prior Publication Data
US 2021/0266626 A1    Aug. 26, 2021

(30) Foreign Application Priority Data
Jun. 7, 2018   (EP) .................................. 18176575

(51) Int. Cl.
*H04N 5/58*     (2006.01)
*H05B 47/10*    (2020.01)
(Continued)

(52) U.S. Cl.
CPC ........... *H05B 47/155* (2020.01); *H05B 47/10* (2020.01); *H05B 47/105* (2020.01)

(58) Field of Classification Search
CPC .... H05B 47/10; H05B 47/155; H05B 47/105; Y02B 20/40
(Continued)

(56) References Cited

U.S. PATENT DOCUMENTS 4,980,806 A * 12/1990 Taylor ................ G05B 19/0421
                                                    362/85
6,611,297 B1 * 8/2003 Akashi .................. H05B 47/10
                                                    348/739
(Continued)

FOREIGN PATENT DOCUMENTS

| EP | 2315442 A1 | 4/2011 |
|---|---|---|
| EP | 3188487 A1 | 7/2017 |

(Continued)

*Primary Examiner* — Trang U Tran

(57) ABSTRACT

An electronic device (1) is configured to determine information indicating or affecting a variation in delay, e.g. variations in one or more delay components (21-26), between a content frame being rendered, e.g. by a mobile device (12), and a light effect synchronized to the content frame starting to be rendered. The electronic device is further configured to select one or more light effects to be rendered simultaneously with a content item based on the determined information and cause one or more light sources (16, 17) to render the selected one or more light effects simultaneously with the content item.

11 Claims, 5 Drawing Sheets

(51) Int. Cl.
*H05B 47/105* (2020.01)
*H05B 47/155* (2020.01)

(58) Field of Classification Search
USPC .......................................................... 348/460
See application file for complete search history.

(56) References Cited

U.S. PATENT DOCUMENTS

| | | | | |
|---|---|---|---|---|
| 10,127,908 | B1* | 11/2018 | Deller | H04L 67/02 |
| 2005/0275626 | A1* | 12/2005 | Mueller | H05B 47/19 |
| | | | | 345/156 |
| 2010/0176752 | A1* | 7/2010 | Xiong | H05B 47/165 |
| | | | | 315/363 |
| 2010/0318201 | A1* | 12/2010 | Cuppen | H05B 47/175 |
| | | | | 315/363 |
| 2011/0190911 | A1* | 8/2011 | Iwanami | H04N 21/235 |
| | | | | 700/90 |
| 2012/0206050 | A1* | 8/2012 | Spero | B60Q 1/1423 |
| | | | | 315/152 |
| 2013/0063042 | A1* | 3/2013 | Bora | H05B 45/20 |
| | | | | 315/292 |
| 2014/0152181 | A1* | 6/2014 | Burkhart | H05B 45/10 |
| | | | | 315/193 |
| 2016/0081164 | A1* | 3/2016 | De Bruijn | H05B 47/155 |
| | | | | 315/149 |
| 2017/0265270 | A1* | 9/2017 | Alfier | H05B 47/175 |
| 2018/0049287 | A1* | 2/2018 | Lu | F21K 9/238 |
| 2018/0132320 | A1* | 5/2018 | Fredricks | H05B 47/19 |
| 2021/0211038 | A1* | 7/2021 | Healy | H03F 3/68 |

FOREIGN PATENT DOCUMENTS

| | | |
|---|---|---|
| WO | 2012145766 A2 | 10/2012 |
| WO | 2014184009 A1 | 11/2014 |
| WO | 2016055648 A1 | 4/2016 |
| WO | 2017162469 A1 | 9/2017 |

\* cited by examiner

SELECTING ONE OR MORE LIGHT EFFECTS IN DEPENDENCE ON A VARIATION IN DELAY

CROSS-REFERENCE TO PRIOR APPLICATIONS

This application is the U.S. National Phase application under 35 U.S.C. § 371 of International Application No. PCT/EP2019/064501, filed on Jun. 4, 2019, which claims the benefit of European Patent Application No. 18176575.1, filed on Jun. 7, 2018. These applications are hereby incorporated by reference herein.

FIELD OF THE INVENTION

The invention relates to an electronic device for causing a light source to render a light effect.

The invention further relates to a method of causing a light source to render a light effect.

The invention also relates to a computer program product enabling a computer system to perform such a method.

BACKGROUND OF THE INVENTION

Home entertainment lighting systems have proven to add a great deal to the experience of games, movies and music. For example, the use of light effects that match with and support content can significantly enhance content playback. In case of music, metadata provided by a streaming service, for example Spotify, can be used for synchronizing light effects with music, allowing creation of a better user experience when listening to the music.

Perfect synchronization allows creation of the best experience. However, even if the precise music data is available, there might be a delay between the music and the light effect. This might be the result of a delay between a notification that a new song has started being received and the song starting to play, for example. Although it is possible to compensate for this delay to a certain extent with a buffer, as described in US 2017/0265270A1, a variation in delay cannot be compensated that easily, while it could significantly impact the listener experience.

SUMMARY OF THE INVENTION

It is a first object of the invention to provide an electronic device, which is able to compensate at least partly for a variation in delay between content rendering and light effect rendering.

It is a second object of the invention to provide a method, which compensates at least partly for a variation in delay between content rendering and light effect rendering.

In a first aspect of the invention, the electronic device comprises at least one processor configured to determine information indicating or affecting a variation in delay between a content frame being rendered and a light effect synchronized to said content frame starting to be rendered, select one or more light effects to be rendered simultaneously with a content item based on said determined information, and cause one or more light sources to render said selected one or more light effects simultaneously with said content item.

The content frame may be part of the content item, but this is not required. Information indicating a variation in delay between a content frame being rendered and a light effect synchronized to said content frame starting to be rendered may be measured using one or more other content items. The words "cause one or more light sources to render said selected one or more light effects simultaneously with said content item" do not require a perfect synchronization.

The inventors have recognized that when certain light effects are poorly synchronized with the corresponding content, e.g. music, this has a much greater impact than when other light effects are poorly synchronized with the corresponding content. By selecting the light effects based on information indicating or affecting a variation in delay, a significant variation in delay no longer has to significantly impact the user experience.

Said at least one processor may be configured to select said one or more light effects further based on an analysis of said content item. If a light script is not available for the content item or if a user does not wish to use an available light script, the content item may be analyzed in real time and light effects matching the content may be selected.

Said at least one processor may be configured to select said one or more light effects from a plurality of light effects specified in a light script. If a light script associated with the content item is used, then the light effects specified therein may be used as basis.

Said at least one processor may be configured to select said one or more light effects by skipping or replacing one or more of said plurality of light effects based on said determined information. While the essence of the light script remains intact, the rendering of the light effects may be adapted in case of a significant variation in delay in order to always provide a good user experience.

Said information may comprise a delay variation parameter representing said variation in delay and said at least one processor is configured to select said one or more light effects based on said delay variation parameter. By determining a delay variation parameter, it becomes easier to add variations in multiple delay components, as each variation can be represented in the same way.

Said at least one processor may be configured to determine a compensation period based on said delay variation parameter and cause said one or more light sources to start rendering said selected one or more light effects said compensation period before scheduled start times (e.g. specified in a light script) for said one or more light effects. The compensation period may be specified as a percentage of a total delay variation. For instance, if a total delay variation of 100 milliseconds has been determined, the compensation period may be determined to be 50 milliseconds (50%). Thus, if the total delay variation is estimated to be 100 milliseconds, the rendering of the light effects may be started 50 milliseconds earlier than specified in a light script for the content being rendered. In this way, the delay may be minimized.

Said at least one processor may be configured to allow a user to provide user input and determine said compensation period further based on said user input. If a user finds it annoying that light effects start to render (too long) before the content frames to which they are synchronized, he may be able to specify that the compensation period should be 25%, i.e. 25 milliseconds if the total delay variation is estimated to be 100 milliseconds. As a result, light effects have a higher chance of starting to render just after the content frames to which they are synchronized instead of just before these content frames. The user may also be to specify a percentage larger than 50% if he finds it annoying that light effects start to render (too long) after the content frames to which they are synchronized. Said at least one processor may be configured to determine said delay variation parameter based on information affecting said variation in delay. For example, information indicating that wireless speakers are used may be associated with a delay variation of 50 ms. A mapping from delay variation range (e.g. 50-100 ms or 100-200 ms) to set of light effects may be used to select the light effects based on this 50 ms. Alternatively, a mapping from information affecting delay variation (e.g. type of speaker connection, type of content service) to set of light effects may be used to select light effects directly, e.g. based on information indicating that wireless speakers are used.

Said at least one processor may be configured to determine a first variation in delay between said electronic device and a content server by requesting a current position of a content item being provided by said content server from said content server at a plurality of moments and comparing differences between said positions with locally timed differences between said moments and determine said delay variation parameter based on said first variation in delay. This allows a variation in a first delay component to be measured. If there are other delay components, the variation in these delay components may be measured (and possibly in the same way) as well and/or one or more of them may be determined based on information affecting the delay variation.

Said at least one processor may be configured to determine whether said delay variation parameter exceeds a certain threshold and select said one or more light effects based on whether said delay variation parameter exceeds said certain threshold. This may be used, for example, if two light scripts have been created, one for relatively low delay variation situations and one for relatively high delay variations (i.e. when the certain threshold is exceeded).

Said at least one processor may be configured to allow a user to adapt said certain threshold. This allows the user to indicate that he wishes to change to light effects that are less sensitive to delay variation sooner than normal or later than normal, for example.

Said at least one processor may be configured to determine a dynamic light effect parameter from said determined delay variation parameter based on a mapping from delay variation parameter to dynamic light effect parameter and select said one or more light effects based on said determined dynamic light effect parameter. For example, a delay variation of less than 100 ms may be mapped to the set of all light effects, a delay variation of 100-150 ms may be mapped to a set of light effects that excludes melody-synchronized light effects and a delay variation of 200 ms may be mapped to a set of light effects that excludes melody-synchronized and beat and bar-synchronized brightness light effects.

Said at least one processor may be configured to allow a user to adapt said determined dynamic light effect parameter and select said one or more light effects based on said adapted dynamic light effect parameter. This allows the user to deviate from the dynamic light effect parameter recommended by the system.

Said at least one processor may be configured to determine said information affecting said variation in delay from a configuration of a system which is used to render said content item. Said information affecting said variation in delay may comprise at least one of: whether wireless speakers are used to render said content item, what type of service is used to render said content item and what type of network connection is used to obtain said content item. This reduces the number of delay variation measurements that is needed without requiring the user to specify this information manually.

Said at least one processor may be configured to exclude light effects with a transition duration shorter than a certain duration minimum, light effects with a brightness higher than a certain brightness maximum, melody-synchronized light effects, and/or beat and bar-synchronized brightness light effects from said selected one or more light effects in dependence on said determined information, said melody-synchronized light effects comprising light effects synchronized to the melody of said content item and said beat and bar-synchronized brightness light effects comprising light effects synchronized to beats and bars of said content item, light effects synchronized to said bars of said content being rendered more noticeable than light effects only synchronized to said beats of said content item. These are light effect that have a much greater much impact on user experience when they are poorly synchronized with the corresponding content than certain other light effects.

Said at least one processor may be configured to determine said information and select one or more light effects based on said determined information multiple times during the rendering of said content item, wherein a switch from a first set of one or more light effects to a second set of one or more light effects only takes place at certain positions in said content item. The delay variation may be determined once, e.g. before starting to render the light effects, but could also be determined multiple times. Preferably, the switch from the first set of light effects to the second set of light effects is not performed at just any position in order to let the switch not affect the user experience.

Said at least one processor may be configured to select said one or more light effects further based on a genre of said content item. The importance of a good synchronization between the light effects and the content sometimes depends on the genre of the content and it is therefore beneficial to select the one or more light effects based on this genre.

In a second aspect of the invention, the method comprises determining information indicating or affecting a variation in delay between a content frame being rendered and a light effect synchronized to said content frame starting to be rendered, selecting one or more light effects to be rendered simultaneously with a content item based on said determined information, and causing one or more light sources to render said selected one or more light effects simultaneously with said content item. Said method may be implemented in hardware and/or software. Said method may be performed by software running on a programmable device. This software may be provided as a computer program product.

Moreover, a computer program for carrying out the methods described herein, as well as a non-transitory computer readable storage-medium storing the computer program are provided. A computer program may, for example, be downloaded by or uploaded to an existing device or be stored upon manufacturing of these systems.

A non-transitory computer-readable storage medium stores at least one software code portion, the software code portion, when executed or processed by a computer, being configured to perform executable operations comprising: determining information indicating or affecting a variation in delay between a content frame being rendered and a light effect synchronized to said content frame starting to be rendered, selecting one or more light effects to be rendered simultaneously with a content item based on said determined information, and causing one or more light sources to render said selected one or more light effects simultaneously with said content item.

As will be appreciated by one skilled in the art, aspects of the present invention may be embodied as a device, a method or a computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit", "module" or "system." Functions described in this disclosure may be implemented as an algorithm executed by a processor/microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples of a computer readable storage medium may include, but are not limited to, the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of the present invention, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or a central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of devices, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

BRIEF DESCRIPTION OF THE DRAWINGS

These and other aspects of the invention are apparent from and will be further elucidated, by way of example, with reference to the drawings, in which.

Corresponding elements in the drawings are denoted by the same reference numeral.

DETAILED DESCRIPTION OF THE EMBODIMENTS

Figure 1:
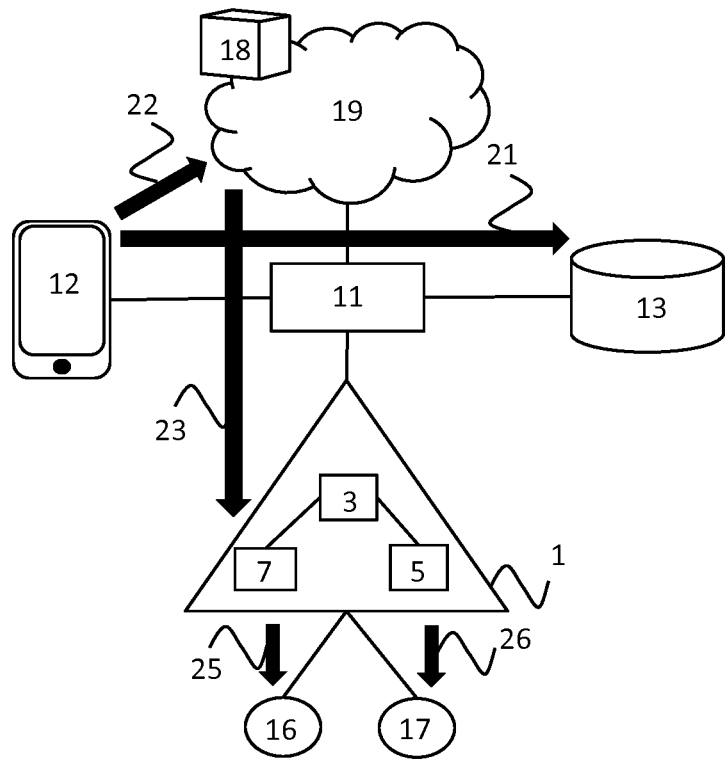
FIG. 1 is a block diagram of a first embodiment of the electronic device of the invention.

FIG. 1 shows a first embodiment of the electronic device of the invention. In this first embodiment, the electronic device of the invention is a bridge 1, e.g. a Philips Hue bridge. The bridge 1 comprises a processor 3, a transceiver 5 and storage means 7. The bridge 1 is connected to a wireless access point 11, e.g. via an Ethernet link. Lights 16 and 17 (e.g. Philips Hue lights) communicate with the bridge 1, e.g. via Zigbee. A smart speaker system 13 and a mobile device 12 are also connected to the wireless access point 11.

A content rendering application running on the mobile device 12 renders content items, e.g. songs, using the smart speaker system 13. The content items are provided by a content service, e.g. Spotify, running on a content server 18. Both the content server 18 and the wireless access point 11 are located on the Internet 19. In the embodiment of FIG. 1, the bridge 1 obtains content metadata and light scripts directly from the content server 18. The content rendering application running on the mobile device 12 and the bridge 1 are linked to the same account of the content service.

If the content items are songs, the synchronization of light effects and music can best be done using a pre-processed data about the song that is playing (meta-data). For example, Spotify provides metadata that contains detailed data of track analysis including tempo, key, segments, beat structure, amongst others. This data can be obtained from the content server 18 when the song starts playing or before the song starts playing in case of a playlist.

Using this data, light effects (e.g. from a light script) can be rendered at precise moments in the track to create a dynamic and immersive experience. For the user to be able to see the effects as intended, the light effect rendering application needs to be synchronized with the audio player, to know precisely when the song starts or to know the current position in the track. For example, Spotify uses a web API (application programming interface) which allows any application to pull the information about the track and time on when it started or where it is at the moment of the request. However, because the request goes over the Internet, there might be a delay in receiving the message from Spotify, and this delay is not always stable or predictable.

To reduce the chance of an undesired user experience, the processor 3 is configured to determine information indicating or affecting a variation in delay between a content frame being rendered and a light effect synchronized to the content frame starting to be rendered. The processor 3 is further configured to select one or more light effects to be rendered simultaneously with a content item based on the determined information and cause light 16 and/or light 17 to render the selected one or more light effects simultaneously with the content item.

Light effects which are less sensitive to synchronization usually provide inferior experience compared to light effects which rely on exact synchronization. However, by using only the former type of effects when the synchronization is estimated to be less precise, i.e. when the variation in delay is high, usage of effects that rely on sync and are played out of sync and which cause a negative user experience may be avoided.

In the embodiment of FIG. 1, the delay between a content frame being rendered and a light effect synchronized to the content frame starting to be rendered comprises five delay components:

delay component 21 between the mobile device 12 and the smart speaker system 13 representing the delay between an audio signal being transmitted by the mobile device 12 and the audio signal being rendered at the smart speaker system 13.

delay component 22 between the mobile device 12 and the content server 18 representing the time it takes for the content playback application running on the mobile device 12 to inform the content server 18 that rendering of the content item has started at the mobile device 12.

delay component 23 between the content server 18 and the bridge 1 representing the time it takes for the content server 18 to inform the bridge 1 that rendering of the content item has started at the mobile device 12.

delay component 25 between the bridge 1 and the light 16 representing the delay between a light command being transmitted by the bridge 1 and the corresponding light effect being rendered at the light 16.

delay component 26 between the bridge 1 and the light 17 representing the delay between a light command being transmitted by the bridge 1 and the corresponding light effect being rendered at the light 17.

In the embodiment of FIG. 1, a delay variation parameter is determined, e.g. measured or determined from information affecting the delay variation, for each delay variation component. The processor 3 is configured to select the one or more light effects to be rendered simultaneously with the content item based on an addition of the multiple delay variation parameters. In an alternative embodiment, delay components which do not vary significantly, e.g. delay components 25 and 26, are omitted.

In the embodiment of the bridge 1 shown in FIG. 1, the bridge 1 comprises one processor 3. In an alternative embodiment, the bridge 1 comprises multiple processors. The processor 3 of the bridge 1 may be a general-purpose processor, e.g. ARM-based, or an application-specific processor. The processor 3 of the bridge 1 may run a Unix-based operating system for example. The storage means 7 may comprise one or more memory units. The storage means 7 may comprise one or more hard disks and/or solid-state memory, for example. The storage means 7 may be used to store a table of connected lights, for example.

The transceiver 5 may use one or more communication technologies to communicate with the wireless access point 11, e.g. Ethernet. In an alternative embodiment, multiple transceivers are used instead of a single transceiver. In the embodiment shown in FIG. 1, a receiver and a transmitter have been combined into a transceiver 5. In an alternative embodiment, one or more separate receiver components and one or more separate transmitter components are used. The bridge 1 may comprise other components typical for a network device such as a power connector. The invention may be implemented using a computer program running on one or more processors.

Figure 2:
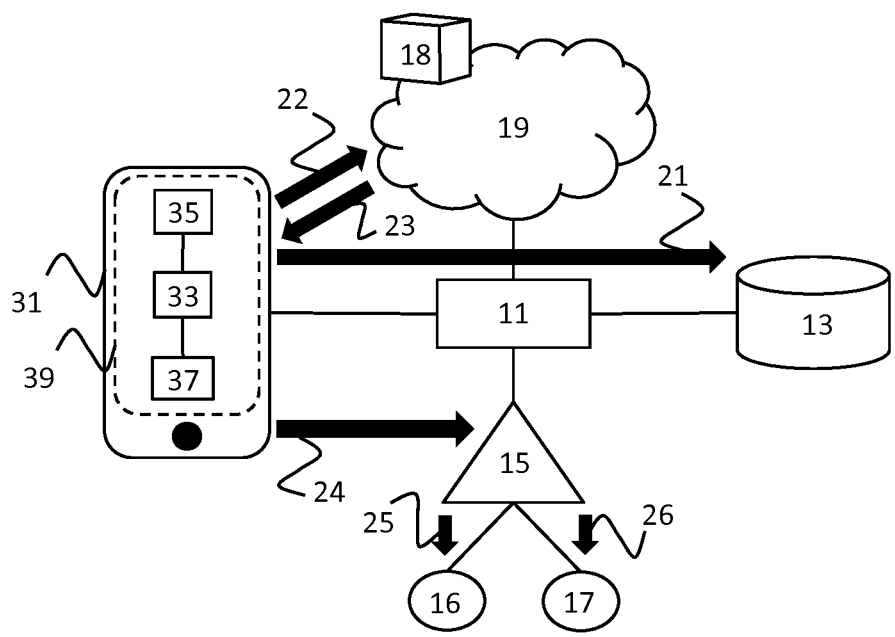
FIG. 2 is a block diagram of a second embodiment of the electronic device of the invention.

In the embodiment of FIG. 2, the electronic device of the invention is a mobile device 31, e.g. a mobile phone or tablet. A content rendering application, e.g. an audio player, running on the mobile device 31 renders content items, e.g. songs, using the smart speaker system 13. A bridge 15 is used instead of bridge 1 of FIG. 1. The bridge 15 does not obtain data directly from content server 18. Instead, a light effect rendering application running on the mobile device 31 obtains content metadata and light scripts from the content server 18. The light effect rendering application running on the mobile device 31 processes the light scripts and transmits light commands to the bridge 15. The bridge 15 then transmits (lower-level) lights commands to the light 16 and/or light 17.

The mobile device 31 comprises a processor 33, a transceiver 35, storage means 37, and a display 39. The processor 33 is configured to determine information indicating or affecting a variation in delay between a content frame being rendered and a light effect synchronized to the content frame starting to be rendered. The processor 33 is further configured to select one or more light effects to be rendered simultaneously with a content item based on the determined information and cause light 16 and/or light 17 to render the selected one or more light effects simultaneously with the content item.

In the embodiment of FIG. 2, the delay between a content frame being rendered and a light effect synchronized to the content frame starting to be rendered comprises an addition delay component:

delay component 24 between the mobile device 31 and the bridge 15 representing the delay between a light command being transmitted by the mobile device 3 and the corresponding (lower-level) light command being transmitted by the bridge 15.

Furthermore, since the content server 18 now informs the mobile device 31 instead of the bridge 15 that that rendering of the content item has started at the mobile device 31, delay component 23 is now between the content server 18 and the mobile device 31 instead of between the content server 18 and the bridge 15.

In the embodiment of the mobile device 31 shown in FIG. 2, the mobile device 31 comprises one processor 33. In an alternative embodiment, the mobile device 31 comprises multiple processors. The processor 33 of the mobile device 31 may be a general-purpose processor, e.g. from Qualcomm or ARM-based, or an application-specific processor. The processor 33 of the mobile device 31 may run an Android or iOS operating system for example. The storage means 37 may comprise one or more memory units. The storage means 37 may comprise one or more hard disks and/or solid-state memory, for example. The storage means 37 may be used to store an operating system, applications and application data, for example.

The transceiver 35 may use one or more wireless communication technologies to communicate with the wireless access point 11, for example. In an alternative embodiment, multiple transceivers are used instead of a single transceiver. In the embodiment shown in FIG. 2, a receiver and a transmitter have been combined into a transceiver 35. In an alternative embodiment, one or more separate receiver components and one or more separate transmitter components are used. The display 39 may comprise an LCD or OLED panel, for example. The display 39 may be a touch screen.

The mobile device 31 may comprise other components typical for a mobile device such as a battery and a power connector. The invention may be implemented using a computer program running on one or more processors.

In the embodiment of FIG. 2, the mobile device 31 renders both the content and the light effects. In an alternative embodiment, a first (e.g. mobile) device renders the content and a second (e.g. mobile) device renders the light effects.

If the content service is a video service, e.g. Netflix, Amazon Prime or Hulu, then a video rendering device, e.g. a TV, may additionally or alternatively be present in the system shown in FIGS. 1 and 2. In this case, one or more different or additional delay components may be taken into account.

Figure 3:
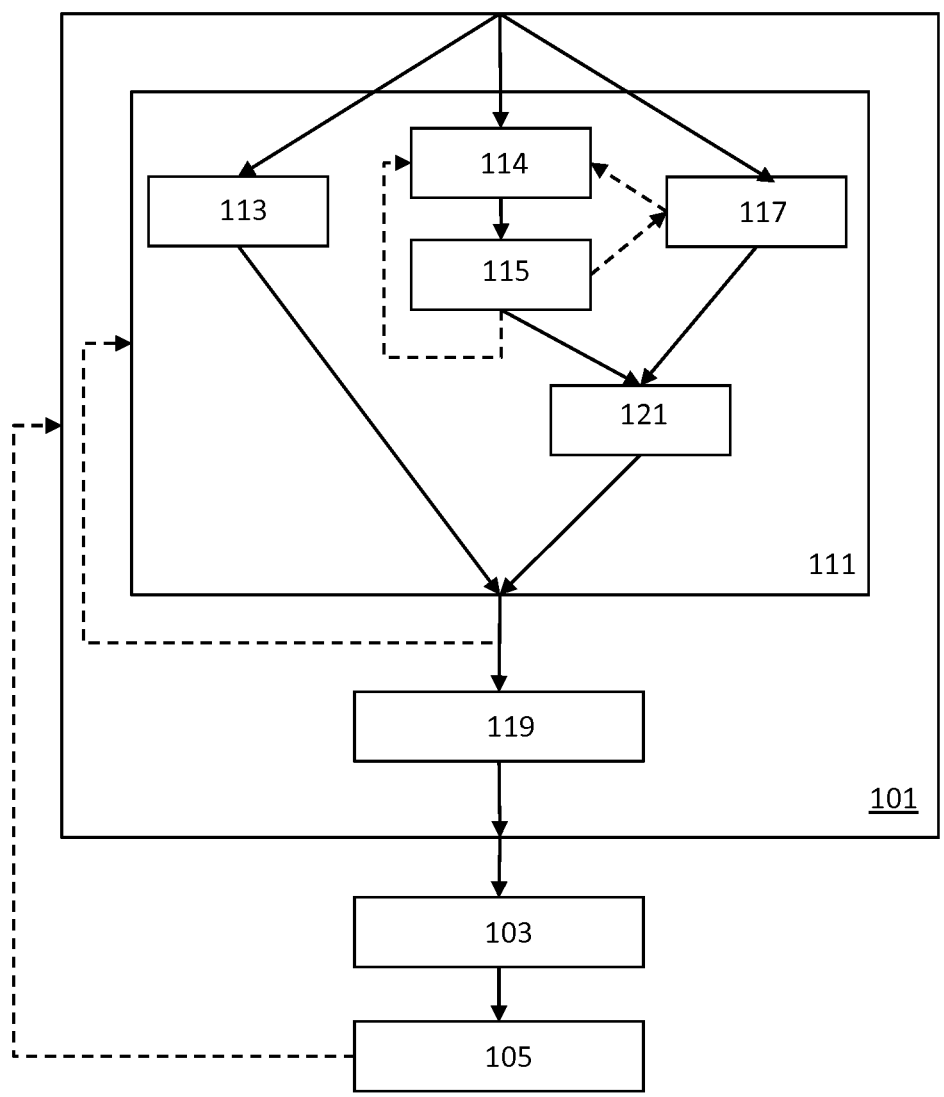
FIG. 3 is a flow diagram of a first embodiment of the method of the invention.

A first embodiment of the method of the invention is shown in FIG. 3. A step 101 comprises determining information indicating or affecting a variation in delay between a content frame being rendered and a light effect synchronized to the content frame starting to be rendered. A step 103 comprises selecting one or more light effects to be rendered simultaneously with a content item based on the determined information. A step 105 comprises causing one or more light sources to render the selected one or more light effects simultaneously with the content item.

In the embodiment of FIG. 3, the information comprises a total delay variation parameter representing the total variation in delay and the at least one processor is configured to select the one or more light effects based on the total delay variation parameter. The total delay variation parameter is calculated in step 101 by, in sub step 119, adding delay variation parameters determined in sub step 111 for individual delay components, as shown in FIGS. 1 and 2. Step 111 is repeated for each component of the network path.

In the embodiment of FIG. 3, the delay variation parameter for a delay component is determined in step 113 or in steps 114-117 and step 121. In step 113, a delay variation parameter is determined based on information affecting the variation in delay. The information affecting the variation in delay may be determined from a configuration of a system which is used to render the content item. The information affecting the variation in delay may comprise at least one of whether wireless speakers are used to render the content item, what type of service is used to render the content item and what type of network connection (e.g. Wi-fi 2.4 GHz, Wi-fi 5 Ghz or wired) is used to obtain the content item, for example.

In step 114, measurement data are obtained. The obtained measurement data are stored in memory in step 115 for future use. This is repeated a plurality of times. In step 117, measurement data previously obtained in step 114 with respect to one or more other content items are retrieved from the memory. In step 121, a delay variation value is determined from the measurement data just obtained in step 114 and at least part of the measurement data obtained in step 117 (some measurement data may have been obtained too long ago).

For example, for one or more delay components, a first variation in delay between an electronic device and a content server may be determined by requesting a current position of a content item being provided by the content server from the content server at a plurality of moments and comparing differences between the positions with locally timed differences between the moments in steps 114 and 121. The delay variation parameter may then be determined based on this first variation in delay in step 119.

As an example of step 101, a delay variation parameter for the delay components shown in FIG. 2 might be determined as follows:

In a first iteration of step 111, the variation in delay component 21 is determined by letting the mobile device 31 transmit an audio fragment to the smart speaker system 13 and use its microphone to detect when the audio fragment starts playing. This done a plurality of times. The minimum of these values is subtracted from the maximum of these values and the result may be used as delay variation for delay component 21. In the embodiment shown in FIG. 1, the variation in delay component 21 may be measured by the mobile device 12 and then transmitted to the bridge 1.

In a second iteration of step 111, the variation in delay components 22 and 23 is determined as follows: In step 114, a current position of a content item being provided by the content server is requested from the content server and the time at which the request is transmitted is determining using a local clock. In step 117, obtained positions and times at which these positions were requested previously in step 114 with respect to another content item are retrieved from the memory. In step 119, the positions obtained in step 114 and at least some of the positions retrieved from the memory in step 117 are compared with the associated timestamps. For two successive positions in the same content item, the differences between the timestamps corresponding to these two successive positions are subtracted from the differences between these two successive positions. This results in a value indicating a variation in delay. This is repeated a plurality of times. The (absolute) maximum of the determined values may be used as delay variation parameter.

In a third iteration of step 111, the variation in delay component 24 is determined in step 113 by determining how the mobile device 31 is connected to the bridge 15 and what kind of bridge is used. If the mobile device and the bridge are connected to the same wireless access point, as depicted in FIG. 2, and a Philips Hue bridge is used, a delay variation of 0 may be used for delay component 24, for example.

In a fourth iteration of step 111, the variation in delay components 25 and 26 is determined in step 113 by determining what kind of bridge is used. If a Philips Hue bridge is used, a delay variation of 0 may be used for delay components 25 and 26, for example.

In this example, a delay variation is measured for a delay which includes delay component 22 and a delay between the current position request being transmitted by the mobile device 31 and received by the content server 18. Delay component 23 is assumed to be similar as the delay between the current position request being transmitted by the mobile device 31 and received by the content server 18.

In an alternative embodiment, instead of using the current position itself in step 114 when determining the variation in delay components 22 and 23, the time at which the message indicating the current position is received is determined in step 114 using the local clock. In this alternative embodiment, the difference between the time of transmitting the request and receiving the response is stored in step 115. This results in a value indicating a delay. Next, differences determined in step 114 and retrieved in step 117 are compared in step 119. The minimum of these values is subtracted from the maximum of these values and the result may be used as delay variation. In this alternative embodiment, a delay variation is measured for a delay which includes delay component 23 and a delay between the current position request being transmitted by the mobile device 31 and received by the content server 18.

Delay component 22 is assumed to be similar as the delay between the current position request being transmitted by the mobile device 31 and received by the content server 18. Since the content rendering application and light effect rendering application are running on the same device in FIG. 2, i.e. mobile device 31, this assumption seems reasonable. Even if the lights are controlled on another device than the device on which the content item is rendered, but this other device is in the same local area network, as depicted in FIG. 1, this assumption still seems reasonable.

In step 103, one or more light effects to be rendered simultaneously with a content item are selected based on the determined total variation in delay. In this embodiment, the one or more light effects are selected from a plurality of light effects specified in a light script if such a light script is available or based on an analysis of the content item otherwise. In the former case, the one or more light effects may be selected by skipping or replacing one or more of the plurality of light effects specified in the light script.

In the embodiment of FIG. 3, a dynamic light effect parameter is determined from the total variation in delay based on a mapping from delay variation parameter to dynamic light effect parameter and the one or more light effects are selected based on the determined dynamic light effect parameter.

Depending on the total variation in delay, certain types of light effects are excluded:

Light effects with a transition duration shorter than a certain duration minimum. These light effects may be skipped or replaced with light effects with a longer duration, for example. Effects with a large transition time are less sensitive than short, snappy effects. A light effect with a longer duration may be specified per section (song) or per scene or shot (video), for example. Such light effects could be regarded as ambience effects. Light effects with a brightness or brightness variation higher than a certain maximum. These light effects may be skipped or replaced with light effects with a lower brightness or brightness variation and/or with color changes instead of brightness changes. Effects with brightness adjusted to beats can create a very immersive experience, but if light blinks off beat, the experience drops significantly. Effects with color changing on beats may create a less immersive, but still positive experience. If the color change happens off beat, it is less noticeable and thus does not impact the experience.

Melody-synchronized light effects: light effects synchronized to the melody of the content item. Light effects which change on rhythmic events like beats are less sensitive than events which changes on non-rhythmic events like melody or a sudden loudness burst, because in case of rhythmic events, the pace (beats per minute) will still match.

Beat and bar-synchronized brightness light effects: light effects synchronized to beats and bars of the content item of which light effects synchronized to the bars of the content are rendered more noticeable (strong effect) than light effects only synchronized to the beats of the content item (in which case a weak light effect is rendered). These light effects may be skipped or replaced with beat-synchronized light effects.

Beat-synchronized light effects and beat and bar-synchronized light effects may be specified in a light script or in a configuration of the light effect rendering application for all beats in a song, for example. In the former case, these light effects may be also specified for all beats in a section. These definitions may be translated to time units (e.g. milliseconds) using the metadata provided by the content service. Alternatively, a user may manually create a light script using this metadata and specify the light effects in time units directly. In this case, the light script should identify what kind of synchronization a light effect attempts to achieve (e.g. beat synchronization, bar+beat synchronization, section synchronization or non-rhythmic event synchronization) in order to determine whether it should be skipped or replaced.

In general, light effects may be skipped or modified, e.g. by increasing transition time, reducing brightness and/or reducing color saturation. In music, light effects which follow the melody (e.g. guitar track) are especially sensitive to variations in delay. Furthermore, chromaticity is less sensitive to delay variation than brightness. In video, it is important not to start rendering light effects synchronized to non-rhythmic events (e.g. an explosion) before the event is shown on screen. In video, both brightness and chromaticity are sensitive to delay variation.

Each possible value of the dynamic light effect parameter is mapped to a set of light effects. A high total variation in delay corresponds to a low value of the dynamic light effect parameter and this low value is mapped to a set of light effects that excludes the four types of light effects mentioned above. This mapping may depend on the genre of the content item. This mapping may be discrete or continuous (e.g. a function).

In the embodiment of FIG. 3, the total variation in delay is determined multiple times during the rendering of the content item and the one or more light effects are also selected based on the total variation in delay multiple times. However, a switch from a first set of one or more light effects to a second set of one or more light effects only takes place at certain positions in the content item, e.g. at scene changes. These certain positions may be defined in the light script or detected automatically.

Figure 4:
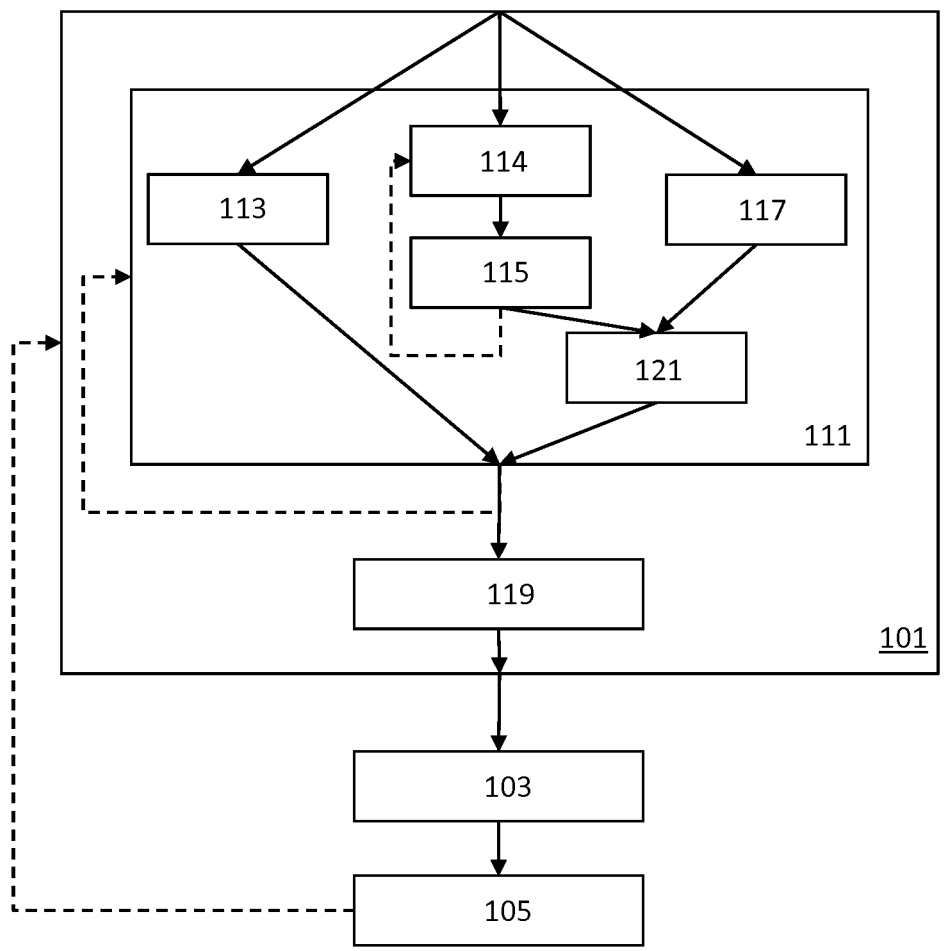
FIG. 4 is a flow diagram of a second embodiment of the method of the invention.

In the embodiment of FIG. 3, the delay variation for a certain delay component is determined using a combination of methods. Measurement data with respect to a current content item are obtained in step 114 and measurement data with respect to one or more other content items are retrieved in step 117. Both are processed in step 121. In the embodiment of FIG. 4, only one method is used per delay component. For example, in the embodiment of FIG. 4, the delay variation for delay components 22 and 23 of FIG. 2 is only determined based on measurement data with respect to other content items. If the delay variation for delay component 21 would also be only determined based on measurement data with respect to other content items, the total variation in delay does not change during the rendering of a content item.

Figure 5:
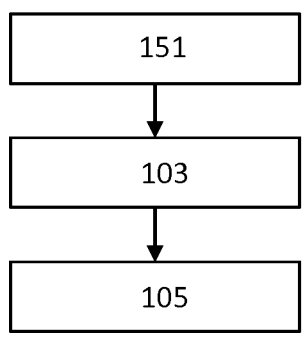
FIG. 5 is a flow diagram of a third embodiment of the method of the invention.

In the embodiment of FIG. 5, step 101 of FIGS. 3 and 4 is replaced with a step 151 in which no delay variation parameter is determined. Instead, the one or more light effects are selected based on information affecting the variation in delay. The information affecting the variation in delay is determined from a configuration of the system which is used to render the content item. This information may comprise at least one of: whether wireless speakers are used to render the content item, what type of service is used to render the content item and what type of network connection is used to obtain the content item. For example, certain light effects may be excluded if a satellite Internet connection is used.

Figure 6:
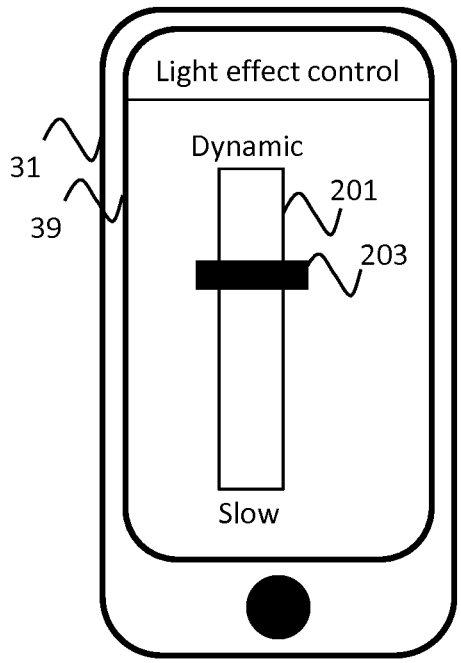
FIG. 6 shows an example of a light effect control user interface when a small variation in delay is present.

In the embodiments of FIGS. 3 and 4, a dynamic light effect parameter is determined automatically based on the total variation in delay. FIG. 6 shows an example of a user interface in which the dynamic light effect parameter can be adapted by the user. The user interface is shown on display 39 of mobile device 31. The user is able to slide a slider 203 over a bar 201 in order to select the dynamicity of the light effects (from slow to dynamic). In this example, setting the dynamic light effect parameter to dynamic results in a larger amount of light effects and stronger light effects (more brightness and more color saturation). In the example of FIG. 6, a small variation delay is present.

Figure 7:
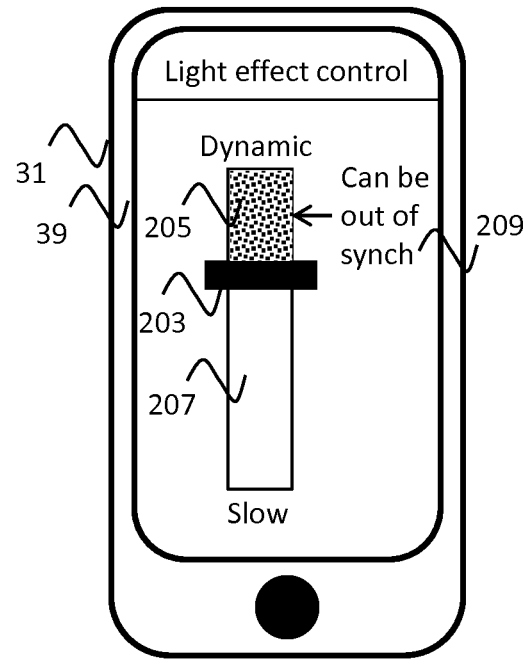
FIG. 7 shows an example of the user interface of FIG. 6 when a significant variation in delay is present.

If the light effect parameter has been determined automatically based on the total variation in delay and a significant variation in delay is present, the user may still be able to adapt the dynamic light effect. This is shown in FIG. 7. An area 205 is marked as "Can be out of synch" with the label 209. The other area 207 of the bar is not marked. This allows the user to change the dynamicity of the light effects while knowing which dynamicity will likely lead to a deteriorated user experience. After the user has adapted the determined dynamic light effect parameter, the one or more light effects are selected based on the adapted dynamic light effect parameter.

In an alternative embodiment, the total variation in delay is mapped directly to a set of light effects. For example, a plurality of ranges may be defined that each map to a different set of light effects. Typically, certain light effects are included in all sets. For example, a delay variation of less than 100 ms may be mapped to the set of all light effects, a delay variation of 100-150 ms may be mapped to a set of light effects that excludes melody-synchronized light effects and a delay variation of 200 ms may be mapped to a set of light effects that excludes melody-synchronized and beat and bar-synchronized brightness light effects.

Figure 8:
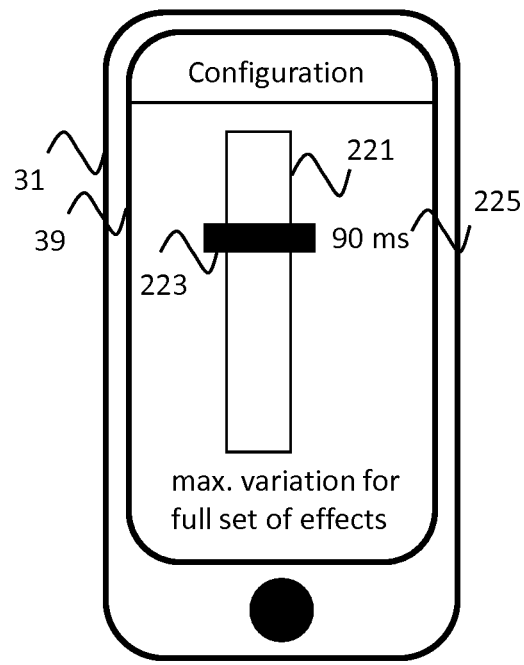
FIG. 8 shows an example of user interface for configuring a threshold for selection of light effects.

In a simple embodiment, only two ranges exist and a certain threshold separates the two ranges. In this embodiment, it is sufficient to determine whether the delay variation parameter exceeds the certain threshold and select the one or more light effects based on whether the delay variation parameter exceeds the certain threshold. The user may be allowed to adapt this certain threshold. This is shown in FIG. 8. In a configuration screen shown on the display 39 of the mobile device 31, the user is able to move a slider 223 over an area 221 in order to specify the certain threshold. The threshold is indicated with label 225 ("90 ms" in the example of FIG. 8). The threshold indicates the maximum variation in delay for the full set of light effects. If the determined total variation in delay exceeds this threshold, a reduced set of light effects is used.

A similar slider as the one shown in FIG. 8 may be used to specify a compensation period or to influence the determination of a compensation period which is determined based on a delay variation parameter. The one or more light sources may then be controlled to start rendering the selected one or more light effects this compensation period before the start times scheduled for the one or more light effects. Thus, the user is provided a possibility to indicate a preference for having approximately equal chance for a light effect to be triggered earlier or later than the corresponding content frame, for having an increased chance for a light effect to be triggered earlier than the corresponding content frame, or for having an increased chance for a light effect to be triggered later than the corresponding content frame.

Figure 9:
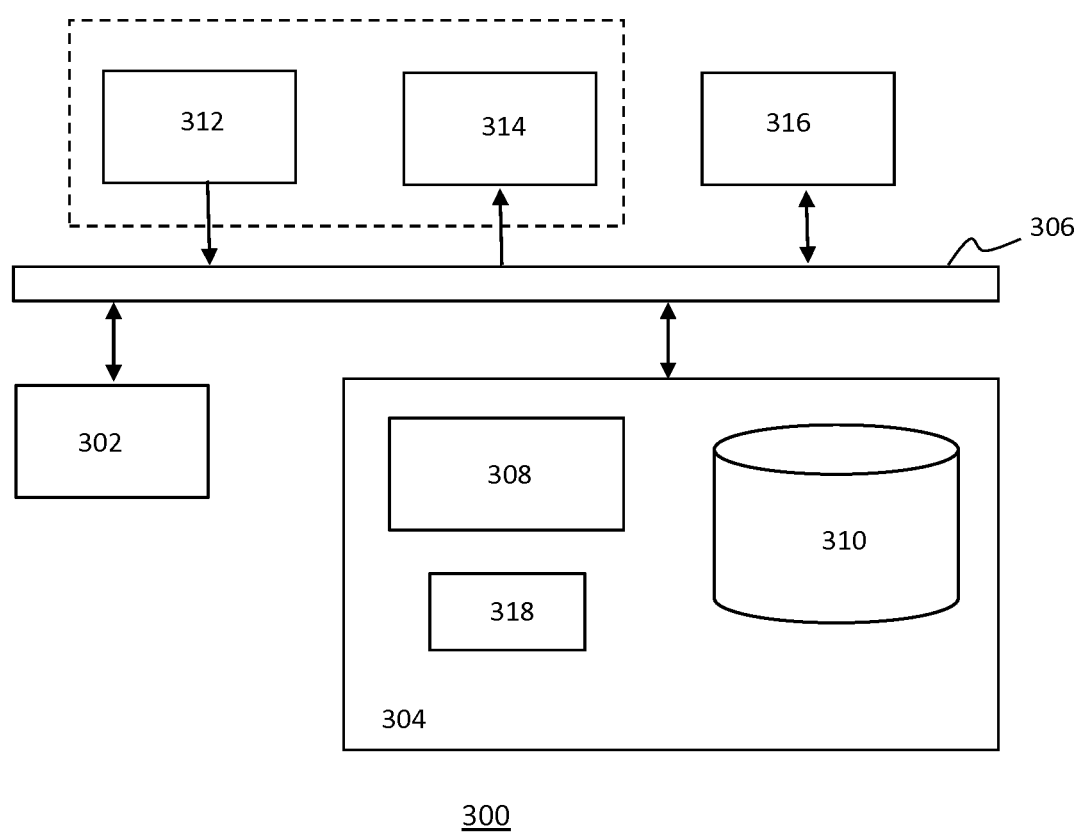
FIG. 9 is a block diagram of an exemplary data processing system for performing the method of the invention.

Whether the compensation period is used or not may depend on whether the delay variation parameter exceeds a certain threshold or not. FIG. 9 depicts a block diagram illustrating an exemplary data processing system that may perform the method as described with reference to FIGS. 3 to 5.

As shown in FIG. 9, the data processing system 300 may include at least one processor 302 coupled to memory elements 304 through a system bus 306. As such, the data processing system may store program code within memory elements 304. Further, the processor 302 may execute the program code accessed from the memory elements 304 via a system bus 306. In one aspect, the data processing system may be implemented as a computer that is suitable for storing and/or executing program code. It should be appreciated, however, that the data processing system 300 may be implemented in the form of any system including a processor and a memory that is capable of performing the functions described within this specification.

The memory elements 304 may include one or more physical memory devices such as, for example, local memory 308 and one or more bulk storage devices 310. The local memory may refer to random access memory or other non-persistent memory device(s) generally used during actual execution of the program code. A bulk storage device may be implemented as a hard drive or other persistent data storage device. The processing system 300 may also include one or more cache memories (not shown) that provide temporary storage of at least some program code in order to reduce the quantity of times program code must be retrieved from the bulk storage device 310 during execution. The processing system 300 may also be able to use memory elements of another processing system, e.g. if the processing system 300 is part of a cloud-computing platform.

Input/output (I/O) devices depicted as an input device 312 and an output device 314 optionally can be coupled to the data processing system. Examples of input devices may include, but are not limited to, a keyboard, a pointing device such as a mouse, a microphone (e.g. for voice and/or speech recognition), or the like. Examples of output devices may include, but are not limited to, a monitor or a display, speakers, or the like. Input and/or output devices may be coupled to the data processing system either directly or through intervening I/O controllers.

In an embodiment, the input and the output devices may be implemented as a combined input/output device (illustrated in FIG. 9 with a dashed line surrounding the input device 312 and the output device 314). An example of such a combined device is a touch sensitive display, also sometimes referred to as a "touch screen display" or simply "touch screen". In such an embodiment, input to the device may be provided by a movement of a physical object, such as e.g. a stylus or a finger of a user, on or near the touch screen display.

A network adapter 316 may also be coupled to the data processing system to enable it to become coupled to other systems, computer systems, remote network devices, and/or remote storage devices through intervening private or public networks. The network adapter may comprise a data receiver for receiving data that is transmitted by said systems, devices and/or networks to the data processing system 300, and a data transmitter for transmitting data from the data processing system 300 to said systems, devices and/or networks. Modems, cable modems, and Ethernet cards are examples of different types of network adapter that may be used with the data processing system 300.

As pictured in FIG. 9, the memory elements 304 may store an application 318. In various embodiments, the application 318 may be stored in the local memory 308, the one or more bulk storage devices 310, or separate from the local memory and the bulk storage devices. It should be appreciated that the data processing system 300 may further execute an operating system (not shown in FIG. 9) that can facilitate execution of the application 318. The application 318, being implemented in the form of executable program code, can be executed by the data processing system 300, e.g., by the processor 302. Responsive to executing the application, the data processing system 300 may be configured to perform one or more operations or method steps described herein.

Various embodiments of the invention may be implemented as a program product for use with a computer system, where the program(s) of the program product define functions of the embodiments (including the methods described herein). In one embodiment, the program(s) can be contained on a variety of non-transitory computer-readable storage media, where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored. The computer program may be run on the processor 302 described herein.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration, but is not intended to be exhaustive or limited to the implementations in the form disclosed. Many modifications and variations will be apparent to those of ordinary skill in the art without departing from the scope and spirit of the present invention. The embodiments were chosen and described in order to best explain the principles and some practical applications of the present invention, and to enable others of ordinary skill in the art to understand the present invention for various embodiments with various modifications as are suited to the particular use contemplated.

The invention claimed is:

1. An electronic device comprising at least one processor configured to:

determine a delay variation parameter representing a variation in delay between a fragment of audio and/or visual content being rendered and a light effect synchronized to said fragment starting to be rendered, determine whether said delay variation parameter exceeds a user-selected-certain threshold;

automatically select one or more light effects, from a reduced set of light effects which are less sensitive to delay variation based on said user-selected certain threshold, to be rendered simultaneously with an audio and/or visual content item when said delay variation parameter exceeds said user-selected certain threshold, and to select said one or more light effects further based on a genre of said audio and/or visual content item, and cause one or more light sources to render said selected one or more light effects simultaneously with said content item.

2. An electronic device as claimed in claim 1, wherein said at least one processor is configured to determine said delay variation parameter based on information affecting said variation in delay.

3. An electronic device as claimed in claim 1, wherein said at least one processor is configured to:

determine a first variation in delay between said electronic device and a audio and/or visual content server by requesting a current position of a audio and/or visual content item being provided by said audio and/or visual content server from said audio and/or visual content server at a plurality of moments and comparing differences between said positions with locally timed differences between said moments; and determine said delay variation parameter based on said first variation in delay.

4. An electronic device as claimed in claim 1, wherein said at least one processor is configured to determine a dynamic light effect parameter from said determined delay variation parameter based on a mapping from delay variation parameter to dynamic light effect parameter and select said one or more light effects based on said determined dynamic light effect parameter.

5. An electronic device as claimed in claim 4, wherein said at least one processor is configured to allow a user to adapt said determined dynamic light effect parameter and select said one or more light effects based on said adapted dynamic light effect parameter.

6. An electronic device as claimed in claim 1, wherein said at least one processor is configured to determine said information affecting said variation in delay from a configuration of a system which is used to render said content item.

7. An electronic device as claimed in claim 6, wherein said information affecting said variation in delay comprises at least one of: whether wireless speakers are used to render said content item, what type of service is used to render said content item and what type of network connection is used to obtain said content item.

8. An electronic device as claimed in claim 1, wherein said at least one processor is configured to exclude light effects with a transition duration shorter than a certain duration minimum, light effects with a brightness higher than a certain brightness maximum, melody-synchronized light effects, and/or beat and bar-synchronized brightness light effects from said selected one or more light effects in dependence on said determined information, said melody-synchronized light effects comprising light effects synchronized to the melody of said audio and/or visual content item and said beat and bar-synchronized brightness light effects comprising light effects synchronized to beats and bars of said audio and/or visual content item, light effects synchronized to said bars of said audio and/or visual content being rendered more noticeable than light effects only synchronized to said beats of said audio and/or visual content item.

9. An electronic device as claimed in claim 1, wherein said at least one processor is configured to determine said information and select one or more light effects based on said determined information multiple times during the rendering of said audio and/or visual content item, wherein a switch from a first set of one or more light effects to a second set of one or more light effects only takes place at certain positions in said audio and/or visual content item.

10. A method of causing a light source to render a light effect, comprising:

determining a delay variation parameter representing a variation in delay between a fragment of audio and/or visual content being rendered and a light effect synchronized to said content frame starting to be rendered;

determining whether said delay variation parameter exceeds a user-selected certain threshold;

automatically selecting one or more light effects, from a reduced set of light effects which are less sensitive to delay variation based on said user-selected certain threshold, to be rendered simultaneously with an audio and/or visual content item when said delay variation parameter exceeds said certain threshold, and selecting said one or more light effects further based on a genre of said audio and/or visual content item; and causing one or more light sources to render said selected one or more light effects simultaneously with said content item.

11. A non-transitory computer readable medium comprising computer program code to perform the method of claim 10 when the computer program code is run on one or more processors.

* * * * *